United States Patent
Yang

(10) Patent No.: US 9,146,701 B2
(45) Date of Patent: Sep. 29, 2015

(54) GROUP PRINTING METHOD AND SYSTEM

(71) Applicant: Primax Electronics Ltd., Neihu, Taipei (TW)

(72) Inventor: Jung-Chang Yang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 14/192,290

(22) Filed: Feb. 27, 2014

(65) Prior Publication Data

US 2015/0146240 A1    May 28, 2015

(30) Foreign Application Priority Data

Nov. 22, 2013 (TW) .............................. 102142709 A

(51) Int. Cl.
*H04N 1/04* (2006.01)
*G06F 3/12* (2006.01)

(52) U.S. Cl.
CPC .............. *G06F 3/124* (2013.01); *G06F 3/1215* (2013.01); *G06F 3/1291* (2013.01); *G06F 3/1241* (2013.01)

(58) Field of Classification Search
CPC ...... G06F 3/124; G06F 3/1215; G06F 3/1291
USPC ................................ 358/1.15, 1.9, 1.14, 1.13
See application file for complete search history.

(56) References Cited

U.S. PATENT DOCUMENTS

| 8,902,458 | B2 * | 12/2014 | Ishibashi ...................... 358/1.15 |
| 8,908,220 | B2 * | 12/2014 | Miyazawa et al. ........... 358/1.16 |
| 8,976,396 | B2 * | 3/2015 | Hayakawa .................... 358/1.15 |

* cited by examiner

*Primary Examiner* — Houshang Safaipour
(74) *Attorney, Agent, or Firm* — Kirton McConkie; Evan R. Witt

(57) ABSTRACT

A group printing method and a group printing system are provided. The group printing system includes a control point, an intermediary printing device, and plural digital media printers. The group printing method includes following steps. The control point and the intermediary printing device issue device search broadcasts. The intermediary printing device and each of the digital media printers issue response broadcast to the control point and the intermediary printing device. At least two of the plural digital media printers are set as a printer group. The intermediary printing device splits the print command into plural split print commands and transmits the plural split print commands to the digital media printers of the printer group. Since the print command is split into the plural split print commands and the plural split print commands are executed by respective digital media printers, the printing speed is enhanced.

16 Claims, 8 Drawing Sheets

GROUP PRINTING METHOD AND SYSTEM

FIELD OF THE INVENTION

The present invention relates to a group printing method and a group printing system, and more particularly to a group printing method and a group printing system for being used in a Digital Living Network Alliance (DLNA) architecture.

BACKGROUND OF THE INVENTION

The Digital Living Network Alliance (DLNA) is an alliance organization that is composed by the manufacturers of consumer electronics products, mobile phones and computers. The DLNA is responsible for defining unified transmission specifications to allow a variety of products from different manufacturers to communicate with each other. Consequently, the video and audio devices that comply with the DLNA protocol can be in direct communication with each other, make synchronization action or even transfer data.

The devices that are operated under the DLNA environment include for example a digital media server (DMS), a digital media player (DMP), a digital media renderer (DMR), a digital media controller (DMC) and a digital media printer (DMPr). The digital media player (DMP) and the digital media controller (DMC) are also referred as control points (CP).

Generally, according to the capability of the control point, the printing system of the DLNA architecture has two operating modes. The two operating modes of the printing system will be illustrated in more details as follows.

FIG. 1 schematically illustrates a first printing system of a conventional DLNA architecture. As shown in FIG. 1, a control point 10 comprises a first printing controller (Printing Controller-1, +PR1+) 101. Via the control point 10, a ready-to-print file is browsed and selected from the control point 10 by the user. Then, a print command S1 and a XHTML print file 11 corresponding to the ready-to-print file are transmitted from the control point 10 to a digital media printer 12. Then, according to the XHTML print file 11, a request command S2 for acquiring a print content 13 is issued from the digital media printer 12 to the control point 10. According to the request command S2, the print content 13 is transmitted from the control point 10 to the digital media printer 12. Meanwhile, according to the XHTML print file 11, the print content 13 is outputted from the digital media printer 12 to a paper (not shown).

FIG. 2 schematically illustrates a second printing system of a conventional DLNA architecture. As shown in FIG. 2, a control point 14 comprises a second printing controller (Printing Controller-2, +PR2+) 141. Via the control point 14, a ready-to-print file is browsed and selected from the digital media server 15 by the user. Then, an address of a print content 16 corresponding to ready-to-print file is acquired by the control point 14, and the address of the print content 16 is stored into a XHTML print file 17 corresponding to the ready-to-print file. Then, a print command S3 and the XHTML print file 17 are transmitted from the control terminal 14 to a digital media printer 18. Then, according to the XHTML print file 17, a request command S4 for acquiring the print content 16 is issued from the digital media printer 18 to a digital media server 15. According to the request command S4, the print content 16 is transmitted from the digital media server 15 to the digital media printer 18. Meanwhile, according to the XHTML print file 17, the print content 16 is outputted from the digital media printer 18 to a paper (not shown).

Regardless of which type of printing system is operated in the DLNA architecture, a single digital media printer is used to print out the entire of the ready-to-print file. If the ready-to-print file contains a great number of pages, it is difficult for the single digital media printer to process the ready-to-print file. Especially when an old digital media printer or a low-tech digital media printer is employed, the processing time is very lengthy.

As known, the use of a high performance digital media printer to replace the old digital media printer or the low-tech digital media printer may save the printing time. However, the high performance digital media printer is expensive, and the replaced digital media printer is usually discarded. In other words, the high performance digital media printer is neither cost-effective nor environmentally-friendly.

Therefore, there is a need of providing an improved group printing method and an improved group printing system in the DLNA architecture in order to eliminate the above drawbacks.

SUMMARY OF THE INVENTION

An object of the present invention provides a group printing method and a group printing system in the DLNA architecture in order to increase the printing speed.

In accordance with an aspect of the present invention, there is provided a group printing method. The group printing method includes the following steps. In a step (A), a control point issues a first device search broadcast, and an intermediary printing device issues a second device search broadcast. In a step (B), the intermediary printing device receives the first device search broadcast and issues a first response broadcast to the control point, each of the plural digital media printers receives the first device search broadcast and issues a second response broadcast to the control point, and each of the plural digital media printers receives the second device search broadcast and issues a third response broadcast to the intermediary printing device. The plural digital media printers provide printing functions in a Digital Living Network Alliance (DLNA) architecture. In a step (C), the control point acquires a first equipment and service description information from the intermediary printing device according to the first response broadcast, the control point acquires a second equipment and service description information from each of the plural digital media printers according to the second response broadcast, and the intermediary printing device acquires the second equipment and service description information from each of the plural digital media printers according to the third response broadcast. In a step (D), a printer group is set, wherein the printer group comprises at least two of the plural digital media printers. In a step (E), the intermediary printing device receives a print command from the control point and split the print command into plural split print commands. In a step (F), the plural split print commands are transmitted from the intermediary printing device to the digital media printers of the printer group, so that the plural split print commands are executed by the digital media printers, respectively.

In accordance with another aspect of the present invention, there is provided a group printing system. The group printing system includes a control point, an intermediary printing device, and plural digital media printers. The control point issues a first device search broadcast. The intermediary printing device includes a digital media printer module and a control point module. The control point module issues a second device search broadcast. The digital media printer module receives the first device search broadcast and issues a first response broadcast and a first equipment and service description information to the control point. The plural digital media printers provide printing functions in a Digital Living Network Alliance (DLNA) architecture. Each of plural intermediary printing devices receives the first device search broadcast and the second device search broadcast, and issues a second response broadcast, a third response broadcast and a second equipment and service description information to the control point and the control point module of the intermediary printing device. A printer group including at least two of the plural digital media printers is set via the control point or the intermediary printing device. When the digital media printer module of the intermediary printing device receives a print command from the control point, the control point module of the intermediary printing device splits the print command into plural split print commands and transmits the plural split print commands to the digital media printers of the printer group, so that the plural split print commands are executed by the digital media printers, respectively.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
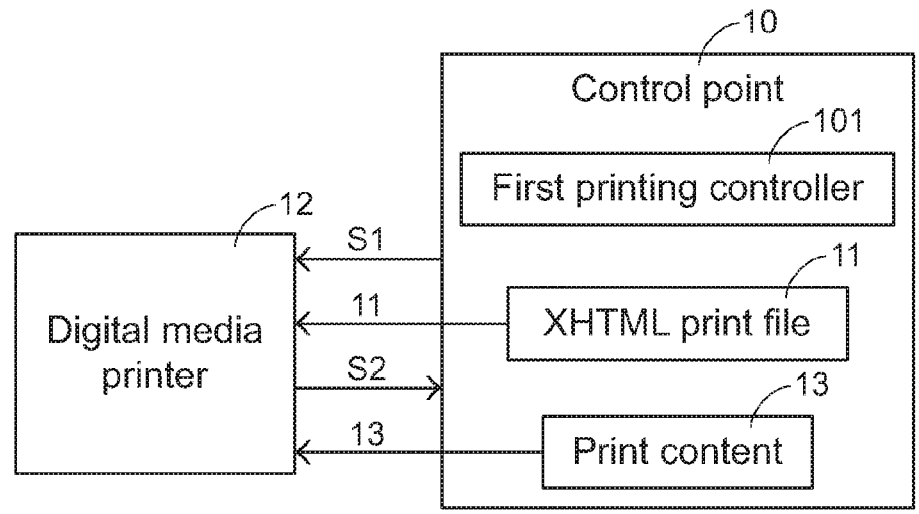
FIG. 1 schematically illustrates a first printing system of a conventional DLNA architecture.
Figure 2:
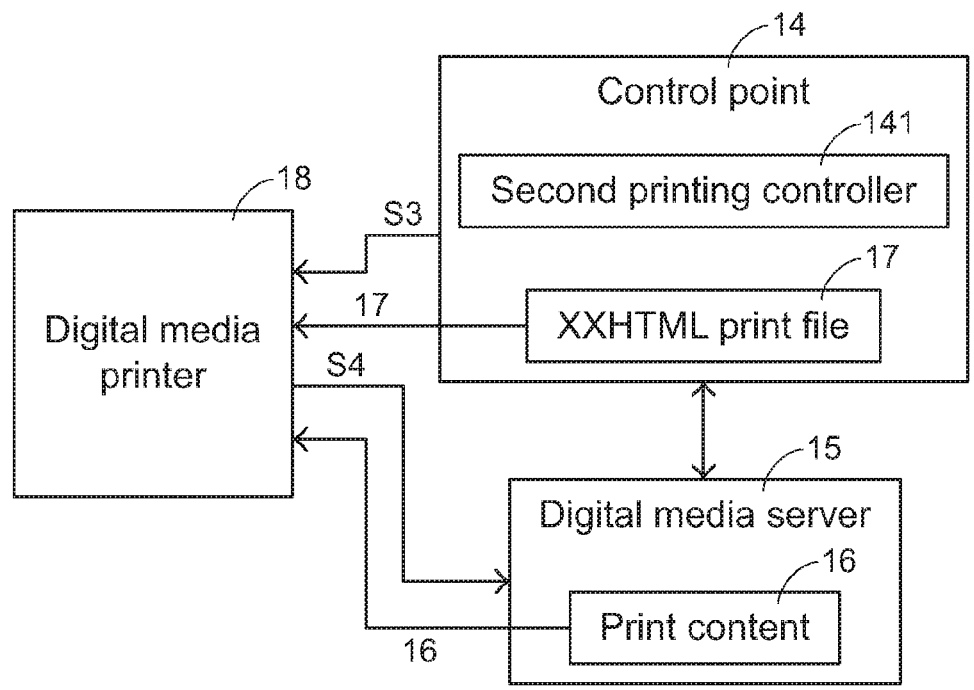
FIG. 2 schematically illustrates a second printing system of a conventional DLNA architecture.
Figure 3:
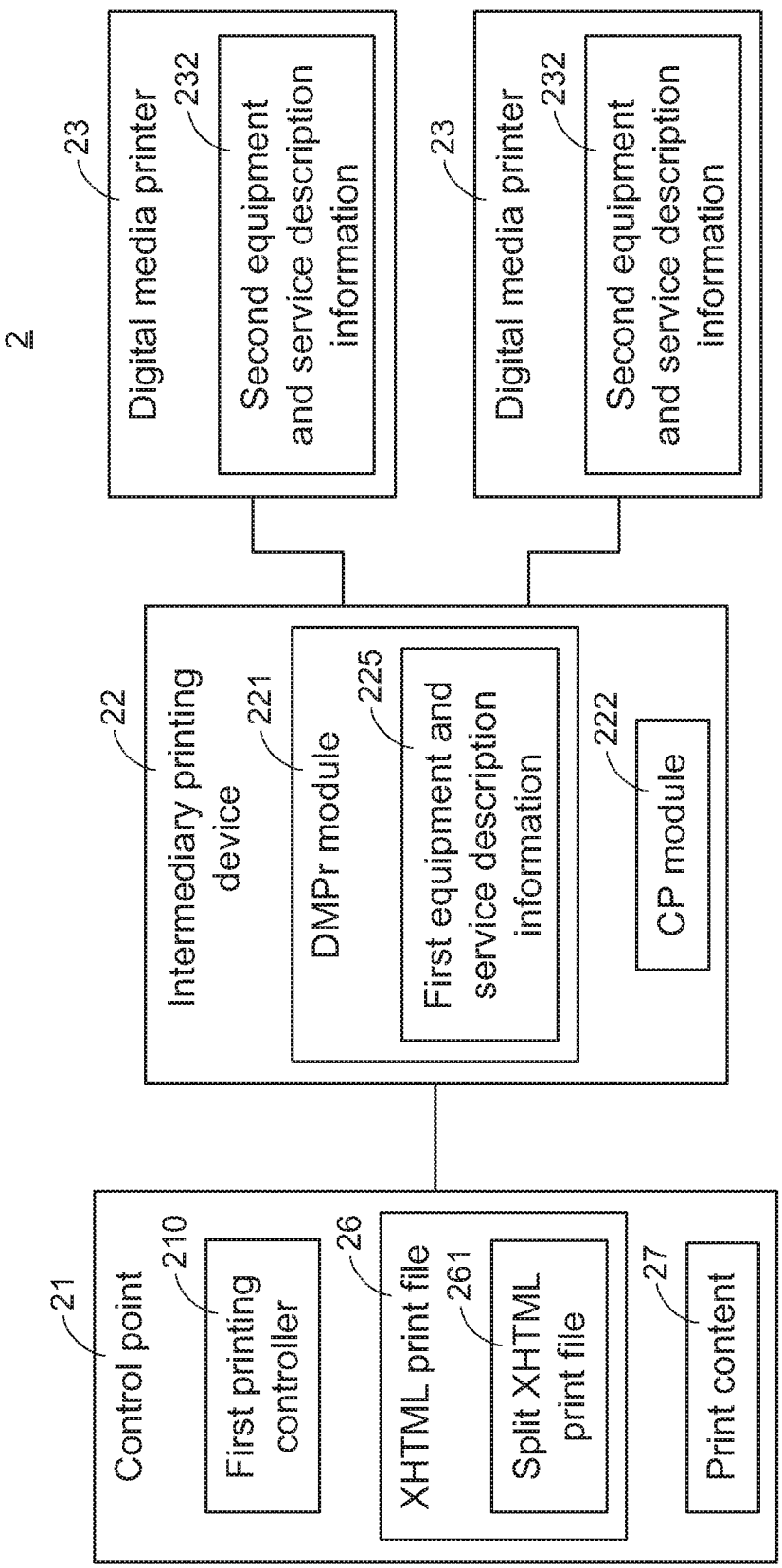
FIG. 3 is a schematic functional block diagram illustrating a group printing system according to a first embodiment of the present invention.

The present invention provides a group printing method and a group printing system. Hereinafter, a group printing system according to a first embodiment of the present invention will be illustrated with reference to FIG. 3. FIG. 3 is a schematic functional block diagram illustrating a group printing system according to a first embodiment of the present invention. As shown in FIG. 3, the group printing system 2 comprises a control point (CP) 21, an intermediary printing device 22, and plural digital media printers (DMPr) 23. The control point 21 comprises a first printing controller 210 (+PR1+). The plural digital media printers 23 may provide a printing function in the DLNA architecture. In this embodiment, the control point 21 is a digital media player (DMP) or a digital media controller (DMC). The intermediary printing device 22 comprises a digital media printer module 221 (also referred as a DMPr module) and a control point module 222 (also referred as a CP module). Consequently, the intermediary printing device 22 has the functions of the digital media printer (DMPr) and the control point (CP). The CP module 222 is a digital media controller (DMC) module or a digital media player (DMP) module. Moreover, the control point 21, the intermediary printing device 22 and the plural digital media printers 23 comply with the DLNA protocol.

In this embodiment, the intermediary printing device 22 is an electronic device without the printing function. For example, the intermediary printing device 22 is a computer or a mobile device. Alternatively, in some other embodiments, the intermediary printing device 22 is an electronic device with the printing function. For example, the intermediary printing device 22 is a printer. The DMPr module 221 and the CP module 222 are software components that are installed in the intermediary printing device 22. For clarification and brevity, only two digital media printers 23 are shown in FIG. 3. It is noted that the number of the digital media printers is not restricted.

Figure 4:
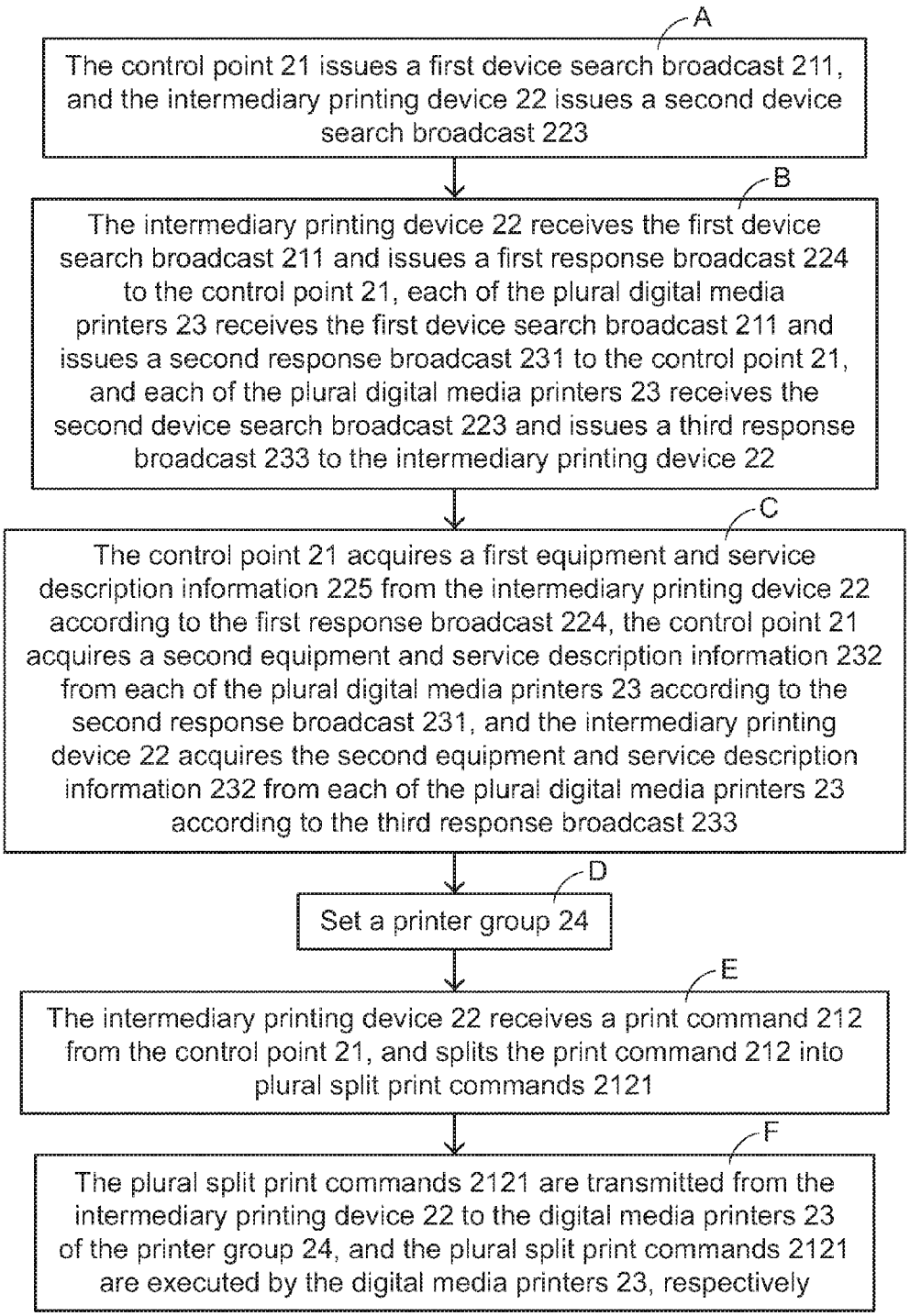
FIG. 4 is a flowchart illustrating a group printing method according to the first embodiment of the present invention.
Figure 5:
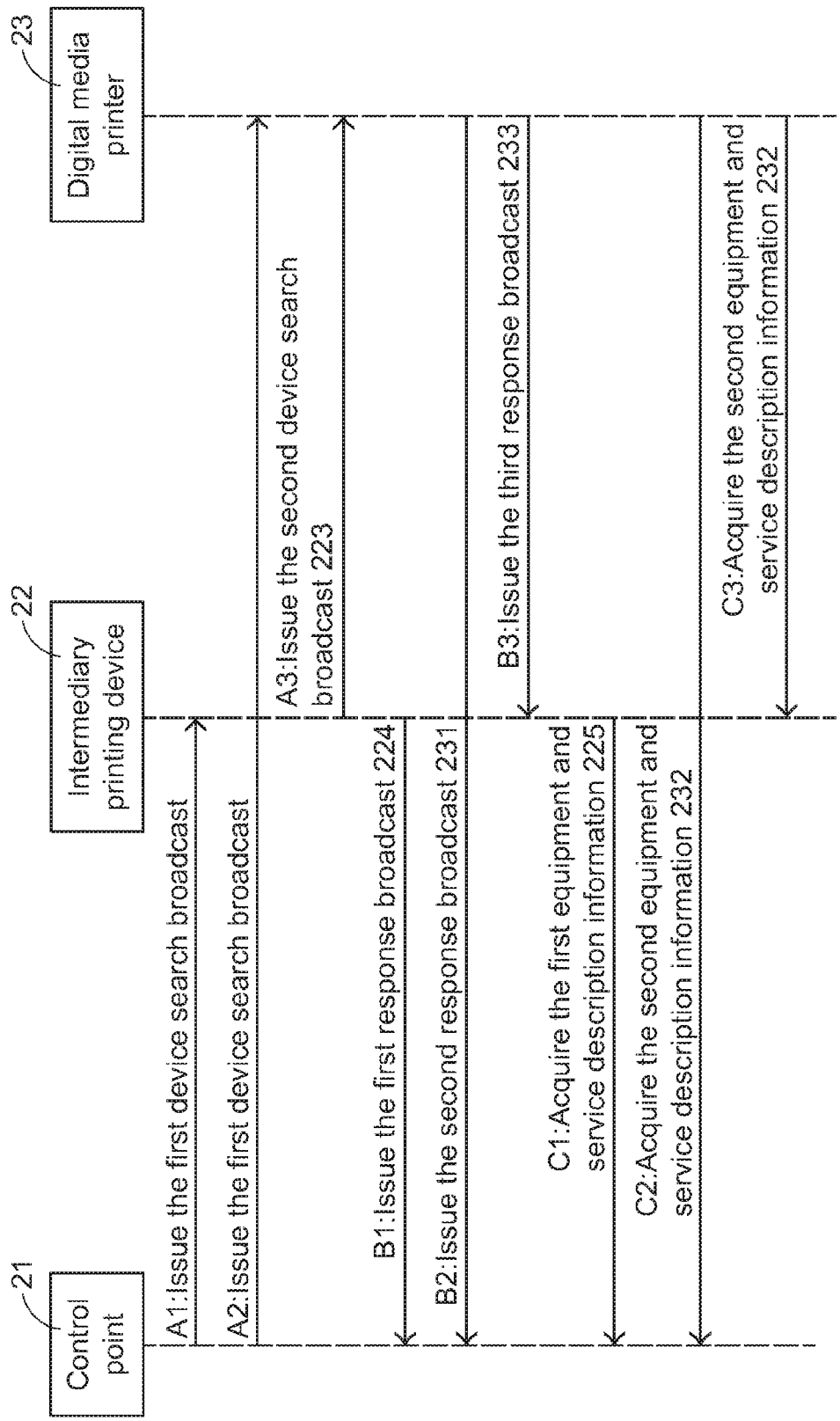
FIG. 5 is a sequence diagram illustrating the steps A, B and C of the group printing method according to the first embodiment of the present invention.

Hereinafter, the group printing method of the present invention will be illustrated with reference to FIGS. 3, 4 and 5. FIG. 4 is a flowchart illustrating a group printing method according to the first embodiment of the present invention. FIG. 5 is a sequence diagram illustrating the steps A, B and C of the group printing method according to the first embodiment of the present invention. The group printing method comprises the following steps.

In a step A, the control point 21 issues a first device search broadcast 211, and the intermediary printing device 22 issues a second device search broadcast 223.

In a step B, the intermediary printing device 22 receives the first device search broadcast 211 and issues a first response broadcast 224 to the control point 21, each of the plural digital media printers 23 receives the first device search broadcast 211 and issues a second response broadcast 231 to the control point 21, and each digital media printer 23 receives the second device search broadcast 223 and issues a third response broadcast 233 to the intermediary printing device 22.

In a step C, the control point 21 acquires a first equipment and service description information 225 from the intermediary printing device 22 according to the first response broadcast 224, the control point 21 acquires a second equipment and service description information 232 from each digital media printer 23 according to the second response broadcast 231, and the intermediary printing device 22 acquires the second equipment and service description information 232 from each digital media printer 23 according to the third response broadcast 233.

In a step D, a printer group 24 is set.

In a step E, the intermediary printing device 22 receives a print command 212 from the control point 21, and splits the print command 212 into plural split print commands 2121.

In a step F, the plural split print commands 2121 are transmitted from the intermediary printing device 22 to the digital media printers 23 of the printer group 24, and the plural split print commands 2121 are executed by the digital media printers 23, respectively.

The operations of the steps A, B and C will be illustrated in more details as follows. Please refer to FIG. 5. The step A comprises steps A1, A2 and A3. The step B comprises steps B1, B2 and B3. The step C comprises steps C1, C2 and C3. The sequence from the step A1 to the step C3 is not restricted. However, the steps A1, B1 and C should be sequentially performed, the steps A2, B2 and C2 should be sequentially performed, and the steps A3, B3 and C3 should be sequentially performed. The sequence as shown in FIG. 5 is presented herein for purpose of illustration and description only. In the following descriptions, the control point 21, the intermediary printing device 22 and the plural digital media printers 23 are all turned on and connected to the same area network.

Firstly, after the control point 21 is turned on and connected to the area network, the control point 21 issues the first device search broadcast 211 to other devices of the same area network (i.e. the steps A1 and A2). The first device search broadcast 211 contains a message-type information and a receiver terminal address. The message-type information is related to a broadcasting purpose. The default receiver terminal is another device of the same area network. Consequently, the message-type information of the first device search broadcast 211 is a search message containing a field "SEARCH", and the receiver terminal address is a combination of a multicast address and a port number (e.g. 239.255.255.250:1900), but is not limited thereto.

After the intermediary printing device 22 is turned on and connected to the area network, the CP module 222 of the intermediary printing device 22 issues the second device search broadcast 223 to other devices of the same area network (i.e. the step A3). Similarly, the second device search broadcast 223 contains a message-type information and a receiver terminal address. The contents of the message-type information and the receiver terminal address of the second device search broadcast 223 are similar to those of the first device search broadcast 211, and are not redundantly described herein.

Moreover, the DMPr module 221 of the intermediary printing device 22 receives the first device search broadcast 211 and issues the first response broadcast 224 to the control point 21 (i.e. the step B1). The first response broadcast 224 contains a message-type information and a transmitter terminal address. The message-type information is related to a broadcasting purpose. Consequently, the message-type information of the first response broadcast 224 is a response message containing a field "OK". The first response broadcast 224 is directly transmitted to the control point 21 which issues the first device search broadcast 211. For allowing the control point 21 to search the intermediary printing device 22 and acquire the required data, the transmitter terminal address of the first response broadcast 224 is an address (URL) of the intermediary printing device 22.

Moreover, each of the plural digital media printers 23 receives the first device search broadcast 211 and issues the second response broadcast 231 to the control point 21 (i.e. the step B2). The second response broadcast 231 contains a message-type information and a transmitter terminal address. The message-type information of the second response broadcast 231 is identical to that of the first response broadcast 224, and is not redundantly described herein. The transmitter terminal address of the second response broadcast 231 is an address (URL) of the digital media printer 23.

Moreover, each of the plural digital media printers 23 receives the second device search broadcast 223 and issues a third response broadcast 233 to the CP module 222 of the intermediary printing device 22 (i.e. the step B3). The third response broadcast 233 contains a message-type information and a transmitter terminal address. The message-type information and the transmitter terminal address of the third response broadcast 233 are similar to those of the second response broadcast 231, and are not redundantly described herein.

After the above steps are performed, the control point 21 and the CP module 222 of the intermediary printing device 22 acquire required data from the intermediary printing device 22 and the plural digital media printers 23 according to the address (URL) of the intermediary printing device 22 and the addresses (URL) of the plural digital media printers 23. In particular, the control point 21 acquires the first equipment and service description information 225 from the DMPr module 221 of the intermediary printing device 22 according to the first response broadcast 224 (i.e. the step C1). According to the first equipment and service description information 225, the control point 21 realizes that the intermediary printing device 22 may be used to implement a print job.

Moreover, the control point 21 acquires the second equipment and service description information 232 from each of the plural digital media printers 23 according to the second response broadcast 231 (i.e. the step C2). According to the second equipment and service description information 232, the control point 21 realizes that the plural digital media printers 23 may be used to implement the print job.

Moreover, the CP module 222 of the intermediary printing device 22 acquires the second equipment and service description information 232 from the plural digital media printers 23 according to the third response broadcast 233 (i.e. the step C3). According to the second equipment and service description information 232, the intermediary printing device 22 realizes that the plural digital media printers 23 may be used to implement the print job.

Figure 6:
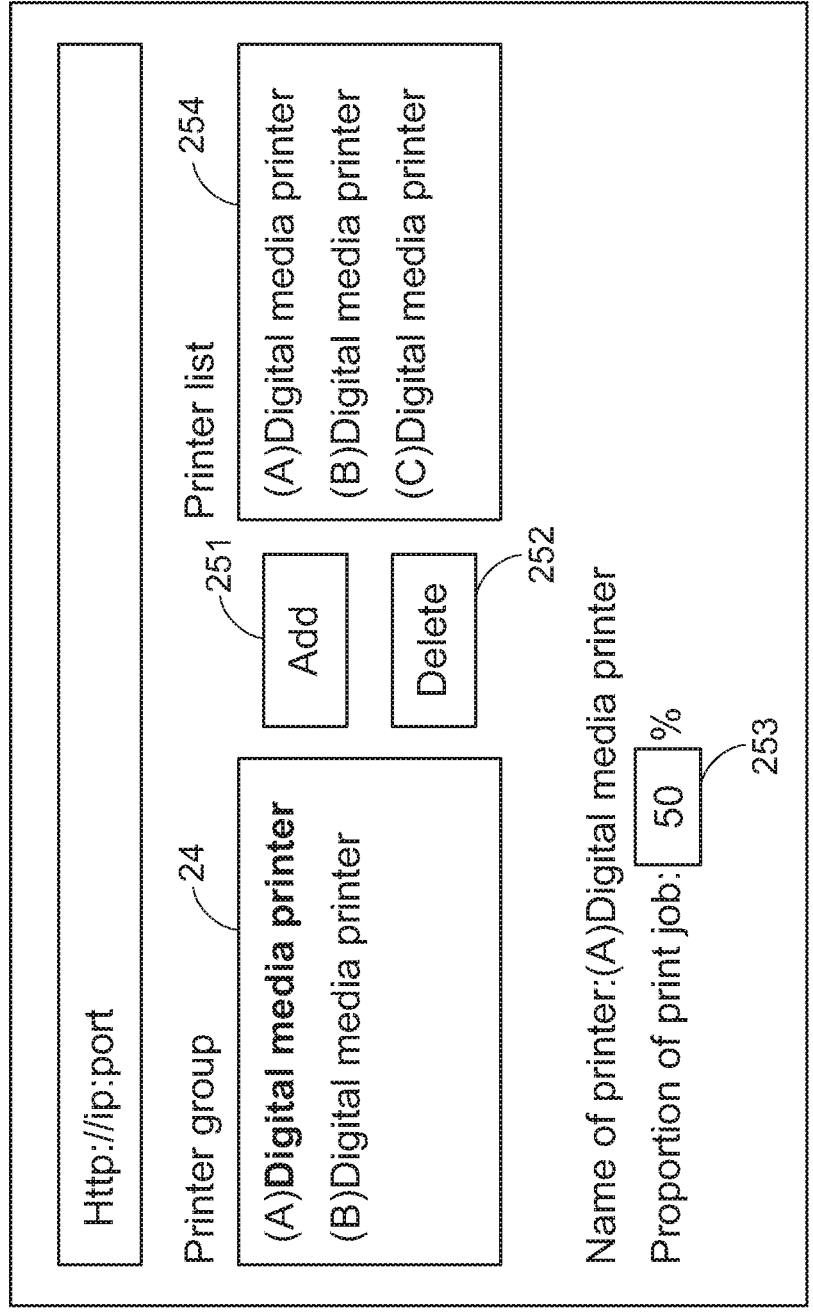
FIG. 6 is a setting interface used in the group printing method according to the first embodiment of the present invention.
Figure 7:
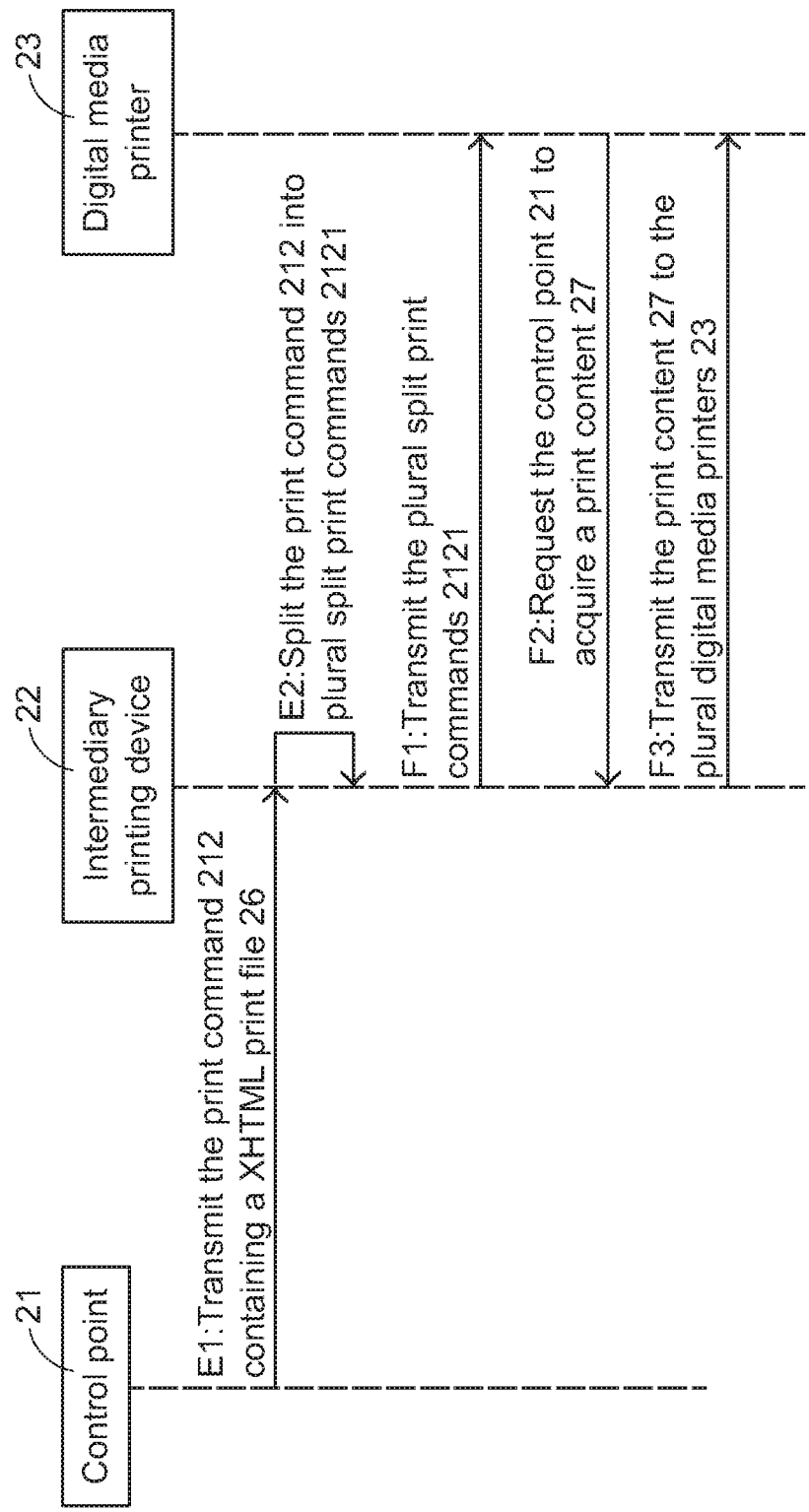
FIG. 7 is a sequence diagram illustrating the steps E and F of the group printing method according to the first embodiment of the present invention.

The operations of the steps D, E and F will be illustrated in more details as follows. Please refer to FIGS. 3, 4, 6 and 7. FIG. 6 is a setting interface used in the group printing method according to the first embodiment of the present invention. FIG. 7 is a sequence diagram illustrating the steps E and F of the group printing method according to the first embodiment of the present invention.

After the searching procedure, the responding procedure and the information acquiring procedure of the above steps A, B and C are performed by the control point 21, the intermediary printing device 22 and the plural digital media printers 23, the step D will be performed.

That is, after the steps A, B and C are performed, the digital media printers 23 of the same area network that are searched by the CP module 222 of the intermediary printing device 22 will be set as members of the printer group 24. Hereinafter, the printer group 24 with two digital media printers 23 will be illustrated. It is noted that the number of the digital media printers 23 belonging to the printer group 24 is not restricted.

Before the print job is performed, the user may open the setting interface 25 of FIG. 6 via the control point 21 or the intermediary printing device 22 in order to set the printer group 24. As shown in FIG. 6, the setting interface 25 comprises an "Add" selective item 251, a "Delete" selective item 252, a percentage input zone 253, a printer list 254, and the contents of the printer group 24. All digital media printers 23 in the same area network are shown in the printer list 254. By clicking any digital media printer 23 of the printer group 24 and then clicking the "Delete" selective item 252, the selected digital media printer 23 is removed from the printer group 24. Moreover, by clicking any digital media printer 23 of the printer list 254 and then clicking the "Add" selective item 251, the selected digital media printer 23 is added to the printer group 24.

Moreover, after any digital media printer 23 of the printer list 254 is selected from the printer group 24, the user may input a numeric value into the percentage input zone 253 in order to determine the proportion of the print job to be taken by the selected digital media printer 23. For example, if a specified digital media printer 23 is selected and a numeric value "50" is inputted into the percentage input zone 253, when a 100-page print job is received, the selected digital media printer 23 is responsible for printing 50 pages of the 100-page print job.

The operations of the steps E and F will be illustrated in more details as follows. Please refer to FIGS. 3, 4 and 7. In this embodiment, the step E comprises steps E1 and E2, and the step F comprises steps F1, F2 and F3. As mentioned above, the control point 21 comprises the first printing controller 210 (+PR1+). Consequently, the user may operate the control point 21 to search a specified file from the control point 21 and designate the intermediary printing device 22 to print the specified file. After the specified file is selected and the intermediary printing device 22 is designated to implement the print job, the DMPr module 221 of the intermediary printing device 22 receives a print command 212 from the control point 21 (i.e. the step E1). Regardless of whether the intermediary printing device 22 has the printing function, the intermediary printing device 22 is considered as a digital media printer by the control point 21 because the intermediary printing device 22 comprises the DMPr module 221. That is, when the control point 21 is operated by the user, the intermediary printing device 22 and the other digital media printers 23 are shown in the printer list.

The print command 212 contains the command of designating the intermediary printing device 22 to perform the print job. In addition, the print command 212 further contains a XHTML print file 26 of a ready-to-print file. The XHTML print file 26 is stored in the control point 21. The XHTML print file 26 contains the print information set by the user. For example, the XHTML print file 26 contains the print information about the number of pages to be printed (i.e. the print range), the paper size, color printing or black and white printing, central alignment or non-central alignment, the information of scaling to paper size or not scaling to paper size, and so on. Moreover, the XHTML print file 26 further contains the stored position of a print content 27 corresponding to the ready-to-print file.

Then, according to the members of the printer group 24 and the proportion of the print job to be taken by each member, the CP module 222 of the intermediary printing device 22 splits the print command 212 into the plural split print commands 2121 (i.e. the step E2). In an embodiment, the printer group 24 comprises two digital media printers 23, and the proportions of the print job to be taken by the digital media printers 23 are 25% and 75%, respectively. If the information of the XHTML print file 26 indicates that the print range is from the first page to the 100-th page, the XHTML print file 26 of the print command 212 is divided into two split XHTML print files 261 by the CP module 222 of the intermediary printing device 22. The print range of one XHTML print file 261 is from the first page to the 25-th page, and the print range of the other XHTML print file 261 is from the 26-th page to the 100-th page. In other words, one of the two split print commands 2121 comprises the split XHTML print file 261 from the first page to the 25-th page, and the other split print commands 2121 comprises the split XHTML print file 261 from the 26-th page to the 100-th page.

In addition to the information about the number of pages to be printed, the other information (including the paper size, color printing or black and white printing, central alignment or non-central alignment, the information of scaling to paper size or not scaling to paper size) of the split XHTML print file 261 is identical to that of the XHTML print file 26. In addition, the split XHTML print file 261 also contains the stored position of the print content 27 corresponding to the ready-to-print file.

Then, the plural split print commands 2121 are transmitted from the CP module 222 of the intermediary printing device 22 to the corresponding digital media printers 23 (i.e. the step F1). For example, in an embodiment, the intermediary printing device 22 splits the print command 212 into two split print commands 2121. In addition, one of the two split print commands 2121 comprises the split XHTML print file 261 from the first page to the 25-th page, and the other split print commands 2121 comprises the split XHTML print file 261 from the 26-th page to the 100-th page. The split print command 2121 comprising the split XHTML print file 261 from the first page to the 25-th page is transmitted to the digital media printer 23 corresponding to the 25%-proportion of the print job. The split print command 2121 comprising the split XHTML print file 261 from the 26-th page to the 100-th page is transmitted to the digital media printer 23 corresponding to the 75%-proportion of the print job. Consequently, according to the stored position of the print content 27 contained in the split XHTML print files 261 of the plural split print commands 2121, the digital media printers 23 may acquire the print content 27 from the control point 21 (i.e. the step F2).

Then, the print content 27 stored in the control point 21 is transmitted from the control point 21 to the plural digital media printers 23 (i.e. the step F3). After the print content 27 is received by the plural digital media printers 23, the print content 27 is printed on papers by the plural digital media printers 23 according to the print information of the split XHTML print files 261. For example, if the split XHTML print file 261 containing the print range from the first page to the 25-th page is received by a specified digital media printer 23, the specified digital media printer 23 will print out the first page to the 25-th page of the print content 27 to papers. In this embodiment, the print content 27 is an image file. The image file is for example a JPEG file, but is not limited thereto. In case that the print content is a non-image file (e.g. a Word file), the non-image file has to be previously transformed into the image file by the control point 21.

Of course, the user may operate the control point 21 to search a specified file from the control point 21 and designate a specified digital media printer 23 to print the selected file. Under this circumstance, the printing process is identical to the conventional printing process, and is not redundantly described herein.

Figure 8:
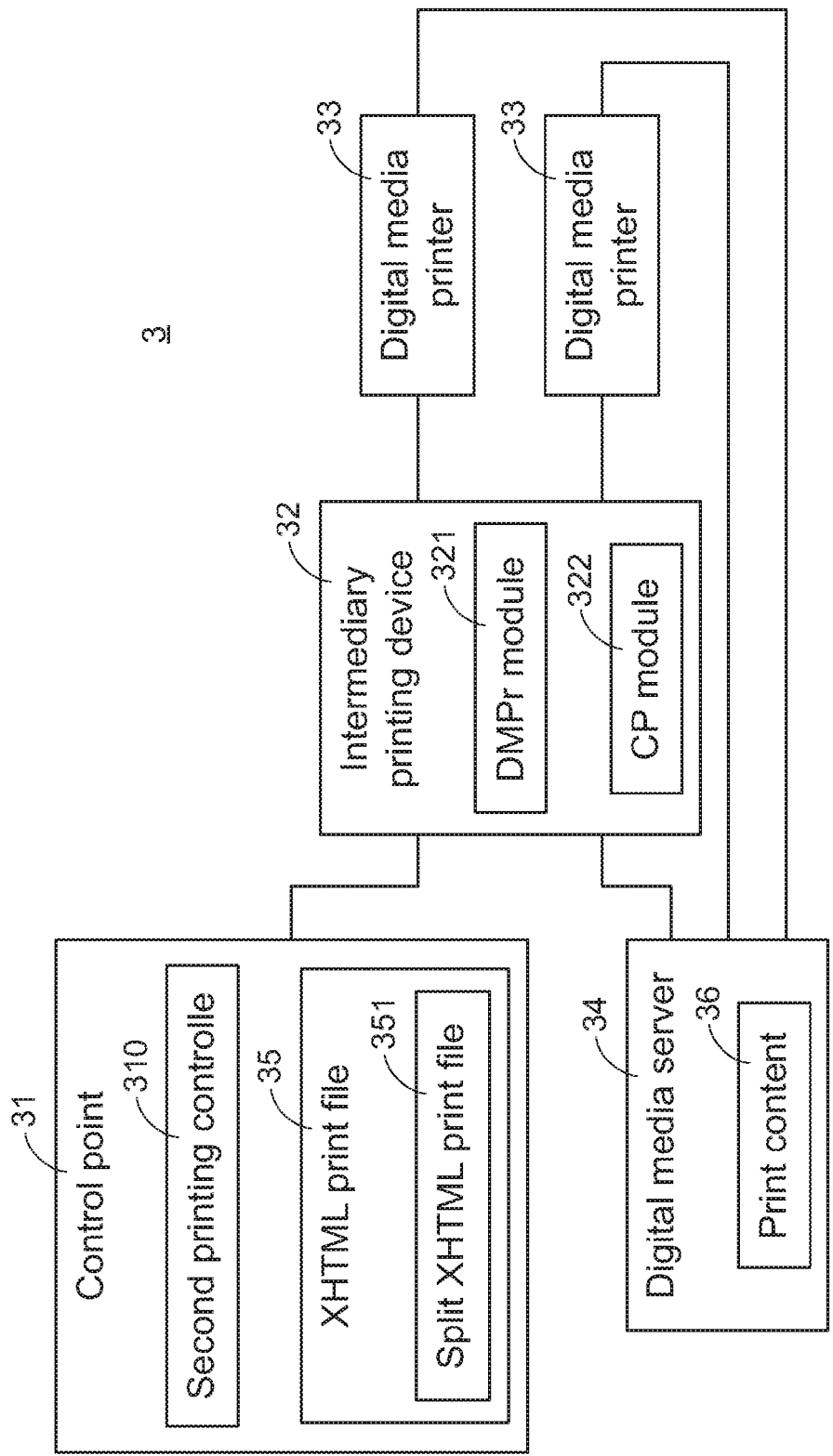
FIG. 8 is a schematic functional block diagram illustrating a group printing system according to a second embodiment of the present invention.

The present invention further provides a second embodiment. FIG. 8 is a schematic functional block diagram illustrating a group printing system according to a second embodiment of the present invention. As shown in FIG. 8, the group printing system 3 comprises a control point (CP) 31, an intermediary printing device 32, plural digital media printers (DMPr) 33, and a digital media server (DMS) 34. The control point 31 comprises a second printing controller 310 (+PR2+). In this embodiment, the control point 31 is a digital media player (DMP) or a digital media controller (DMC). The intermediary printing device 32 comprises a digital media printer module (also referred as a DMPr module) 321 and a control point module (also referred as a CP module) 322. The CP module 322 is a digital media controller (DMC) module or a digital media player (DMP) module. Moreover, all of the control point 31, the intermediary printing device 32, the plural digital media printers 33 and the digital media server 34 comply with the DLNA protocol.

Except for the following two aspects, the constituents and the operating principles of the group printing system 3 of this embodiment are substantially identical to those of the group printing system 2 of the first embodiment, and are not redundantly described herein. Firstly, the control point 31 comprises the second printing controller 310 (+PR2+). Secondly, the print content corresponding to the split print command is acquired from the digital media server 34 by the digital media printers 33.

Figure 9:
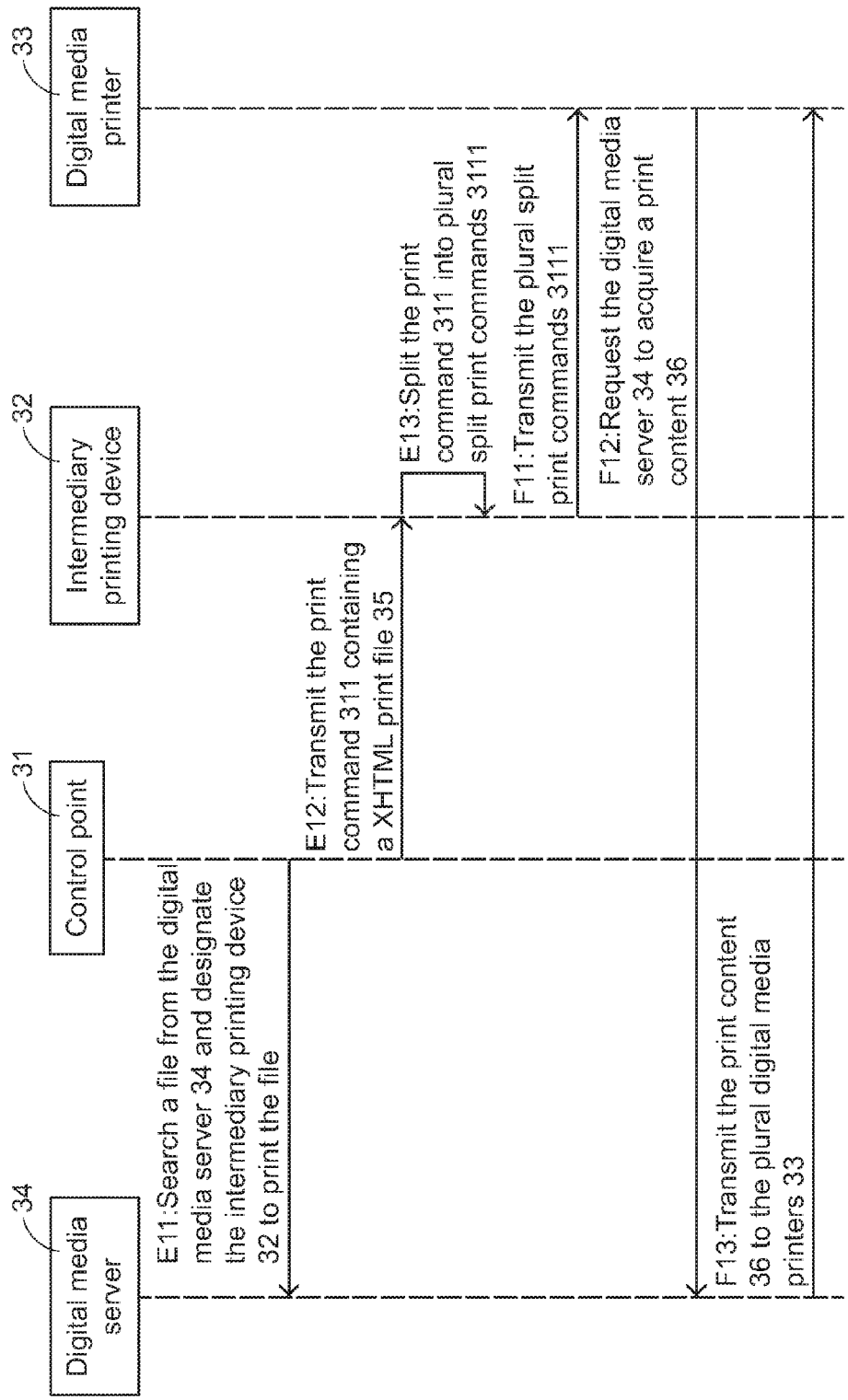
FIG. 9 is a sequence diagram illustrating the steps E and F of the group printing method according to the second embodiment of the present invention.

Please refer to FIGS. 4, 8 and 9. FIG. 9 is a sequence diagram illustrating the steps E and F of the group printing method according to the second embodiment of the present invention. In this embodiment, the step E comprises steps E11, E12 and E13, and the step F comprises steps F11, F12 and F13.

As mentioned above, the control point 31 comprises the second printing controller 310 (+PR2+). Consequently, the user may operate the control point 31 to search a specified file from the digital media server 34 and designate the intermediary printing device 32 to print the specified file (i.e. the step E11). After the specified file is selected from the digital media server 34 and the intermediary printing device 32 is designated to implement the print job, the DMPr module 321 of the intermediary printing device 32 receives a print command 311 (i.e. the step E12).

The print command 311 contains the command of designating the intermediary printing device 32 to perform the print job. In addition, the print command 311 further contains a XHTML print file 35 of a ready-to-print file. The XHTML print file 35 is stored in the control point 31. The XHTML print file 35 contains the print information set by the user. For example, the XHTML print file 35 contains the print information about the number of pages to be printed (i.e. the print range), the paper size, color printing or black and white printing, central alignment or non-central alignment, the information of scaling to paper size or not scaling to paper size, and so on. Moreover, the XHTML print file 35 further contains the stored position of the print content 36 corresponding to the ready-to-print file.

Then, according to the members of the printer group (not shown) and the proportion of the print job to be taken by each member, the CP module 322 of the intermediary printing device 32 splits the print command 311 into the plural split print commands 3111 (i.e. the step E13).

Then, the plural split print commands 3111 are transmitted from the CP module 322 of the intermediary printing device 32 to the corresponding digital media printers 33 (i.e. the step F11). Consequently, according to the stored position of the print content 36 contained in the split XHTML print files 351 of the plural split print commands 3111, the digital media printers 33 may acquire the print content 36 from the digital media server 34 (i.e. the step F12). Then, the print content 36 stored in the digital media server 34 is transmitted from the digital media server 34 to the plural digital media printers 33 (i.e. the step F13). After the print content 36 is received by the plural digital media printers 33, the print content 36 is printed on papers by the plural digital media printers 33 according to the print information of the split XHTML print files 361.

From the above descriptions, the group printing system of the present invention uses the intermediary printing device to implement the functions of a control point (CP) and a digital media printer (DMPr). Through the intermediary printing device, plural digital media printers (DMPr) are connected with each other to be defined as a printer group. When the intermediary printing device is designated to implement the print job, the intermediary printing device splits a print command into plural split print commands, and transmits the plural split print commands to the plural digital media printers, respectively. Consequently, the plural digital media printers work together to print out a ready-to-print file. As previously described, if the ready-to-print file contains a great number of pages, it is difficult for a single digital media printer to process the ready-to-print file. Since the group printing system of the present invention can process the ready-to-print file containing a great number of pages, the processing time is largely saved. Moreover, by using the group printing system of the present invention, the printing speed is enhanced without the need of using the high performance digital media printer. In other words, the group printing system of the present invention is cost-effective and environmentally-friendly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A group printing method, comprising steps of:
   (A) allowing a control point to issue a first device search broadcast, and allowing an intermediary printing device to issue a second device search broadcast;
   (B) allowing the intermediary printing device to receive the first device search broadcast and issue a first response broadcast to the control point, allowing each of plural digital media printers to receive the first device search broadcast and issue a second response broadcast to the control point, and allowing each of the plural digital media printers to receive the second device search broadcast and issue a third response broadcast to the intermediary printing device, wherein the plural digital media printers provide printing functions in a Digital Living Network Alliance (DLNA) architecture;
   (C) allowing the control point to acquire a first equipment and service description information from the intermediary printing device according to the first response broadcast, allowing the control point to acquire a second equipment and service description information from each of the plural digital media printers according to the second response broadcast, and allowing the intermediary printing device to acquire the second equipment and service description information from each of the plural digital media printers according to the third response broadcast;
   (D) setting a printer group, wherein the printer group comprises at least two of the plural digital media printers;
   (E) allowing the intermediary printing device to receive a print command from the control point and split the print command into plural split print commands; and
   (F) allowing the plural split print commands to be transmitted from the intermediary printing device to the digital media printers of the printer group, so that the plural split print commands are executed by the digital media printers, respectively.

2. The group printing method according to claim 1, wherein the intermediary printing device is a computer, a mobile device or a printer.

3. The group printing method according to claim 1, wherein each of the first device search broadcast, the second device search broadcast, the first response broadcast, the second response broadcast and the third response broadcast contains a message-type information.

4. The group printing method according to claim 3, wherein each of the first device search broadcast and the second device search broadcast further contains a receiver terminal address, wherein each of the first response broadcast, the second response broadcast and the third response broadcast further contains a transmitter terminal address.

5. The group printing method according to claim 1, wherein the step (D) is automatically performed by the intermediary printing device, or the step (D) is performed by a user via a setting interface of the control point or the intermediary printing device.

6. The group printing method according to claim 5, wherein via the setting interface, the user selectively adds at least one digital media printer to the printer group, deletes at least one digital media printer from the printer group or inputs a proportion of a print job to be taken by each of the digital media printers of the printer group.

7. The group printing method according to claim 6, wherein in the step (E), the intermediary printing device splits the print command into the plural split print commands according to the proportion of the print job.

8. The group printing method according to claim 1, wherein in the step (F), each of the digital media printers of the printer group acquires a print content corresponding to the split print command from the control point or a digital media server, so that the corresponding split print command is executed by the digital media printer.

9. A group printing system, comprising:
a control point issuing a first device search broadcast;
an intermediary printing device comprising a digital media printer module and a control point module, wherein the control point module issues a second device search broadcast, wherein the digital media printer module receives the first device search broadcast and issues a first response broadcast and a first equipment and service description information to the control point; and
plural digital media printers providing printing functions in a Digital Living Network Alliance (DLNA) architecture, wherein each of plural intermediary printing devices receives the first device search broadcast and the second device search broadcast, and issues a second response broadcast, a third response broadcast and a second equipment and service description information to the control point and the control point module of the intermediary printing device,
wherein a printer group comprising at least two of the plural digital media printers is set via the control point or the intermediary printing device, wherein when the digital media printer module of the intermediary printing device receives a print command from the control point, the control point module of the intermediary printing device splits the print command into plural split print commands and transmits the plural split print commands to the digital media printers of the printer group, so that the plural split print commands are executed by the digital media printers, respectively.

10. The group printing system according to claim 9, wherein the printer group is automatically set by the intermediary printing device, or the printer group is set by a user via a setting interface of the control point or the intermediary printing device.

11. The group printing system according to claim 10, wherein via the setting interface, the user selectively adds at least one digital media printer to the printer group, deletes at least one digital media printer from the printer group or inputs a proportion of a print job to be taken by each of the digital media printers of the printer group.

12. The group printing system according to claim 11, wherein the intermediary printing device splits the print command into the plural split print commands according to the proportion of the print job.

13. The group printing system according to claim 9, wherein each of the digital media printers of the printer group acquires a print content corresponding to the split print command from the control point or a digital media server, so that the corresponding split print command is executed by the digital media printer.

14. The group printing system according to claim 9, wherein the intermediary printing device is a computer, a mobile device or a printer.

15. The group printing system according to claim 9, wherein each of the first device search broadcast, the second device search broadcast, the first response broadcast, the second response broadcast and the third response broadcast contains a message-type information.

16. The group printing system according to claim 15, wherein each of the first device search broadcast and the second device search broadcast further contains a receiver terminal address, wherein each of the first response broadcast, the second response broadcast and the third response broadcast further contains a transmitter terminal address.

\* \* \* \* \*